United States Patent
Osaki

(10) Patent No.: US 12,152,142 B2
(45) Date of Patent: Nov. 26, 2024

(54) SHOE-SOLE RUBBER COMPOSITION AND SHOE

(71) Applicant: ASICS CORPORATION, Kobe (JP)

(72) Inventor: Takashi Osaki, Kobe (JP)

(73) Assignee: ASICS CORPORATION, Kobe (JP)

( * ) Notice: Subject to any disclaimer, the term of this patent is extended or adjusted under 35 U.S.C. 154(b) by 189 days.

(21) Appl. No.: 17/131,378

(22) Filed: Dec. 22, 2020

(65) Prior Publication Data

US 2021/0189102 A1 Jun. 24, 2021

(30) Foreign Application Priority Data

Dec. 23, 2019 (JP) .................................. 2019-231801

(51) Int. Cl.
*C08L 9/06* (2006.01)
*C08L 7/00* (2006.01)
*C08L 15/02* (2006.01)

(52) U.S. Cl.
CPC .................. *C08L 7/00* (2013.01); *C08L 9/06* (2013.01); *C08L 15/02* (2013.01); *C08L 2205/03* (2013.01)

(58) Field of Classification Search
CPC ........... C08L 7/00; C08L 9/06; C08J 2423/22; C04B 2103/0047
See application file for complete search history.

(56) References Cited

U.S. PATENT DOCUMENTS

| 6,335,392 | B1 | 1/2002 | Umezawa et al. |
| 2005/0131107 | A1 | 6/2005 | Okel et al. |
| 2006/0165581 | A1* | 7/2006 | Stenzel .................... C01B 33/12 |
| | | | 423/339 |
| 2015/0203670 | A1 | 7/2015 | Feldhues et al. |
| 2018/0099527 | A1* | 4/2018 | Miyazaki .................. B60C 1/00 |
| 2018/0240565 | A1* | 8/2018 | Simmons ............... C08G 73/06 |

FOREIGN PATENT DOCUMENTS

| CN | 104428357 A | 3/2015 | |
| JP | 3100592 B2 | 10/2000 | |
| JP | 2009013218 A * | 1/2009 | ............. Y02T 10/86 |
| WO | 2006/065578 A2 | 6/2006 | |
| WO | WO2014188529 A1 * | 11/2014 | ............. A43B 13/04 |

OTHER PUBLICATIONS

JP2009013218A ENglish Translation (Year: 2009).*
WO2014188529A1 (Year: 2014).*
The extended European search report issued by the European Patent Office on May 3, 2021, which corresponds to European Patent Application No. 20216142.8-1005 and is related to U.S. Appl. No. 17/131,378.

(Continued)

*Primary Examiner* — Catherine S Branch
*Assistant Examiner* — Huihong Qiao
(74) *Attorney, Agent, or Firm* — Studebaker & Brackett PC

(57) ABSTRACT

Provided is a shoe-sole rubber composition including a white filler of 50 mass parts to 100 mass parts, having an inclination of an approximate straight line of plots obtained from input energy (Ein)-hysteresis loss (Ehys) is 0.6 or more, a gel fraction of 80% or less, and a complex modulus of 30 MPa or more.

23 Claims, 2 Drawing Sheets

(56) References Cited

OTHER PUBLICATIONS

Communication pursuant to Article 94(3) EPC issued by the European Patent Office on May 20, 2022, which corresponds to European Patent Application No. 20 216 142.8-1015 and is related to U.S. Appl. No. 17/131,378.
An Office Action mailed by China National Intellectual Property Administration on Feb. 24, 2024, which corresponds to Chinese Patent Application No. 202011386812.6 and is related to U.S. Appl. No. 17/131,378; with English language translation.
Office Action mailed by China National Intellectual Property Administration on Sep. 4, 2024, which corresponds to Chinese Patent Application No. 202011386812.6 and is related to U.S. Appl. No. 17/131,378; with English language translation.

* cited by examiner

SHOE-SOLE RUBBER COMPOSITION AND SHOE

CROSS-REFERENCE TO RELATED APPLICATION

This application claims priority to Japanese Patent Application No. 2019-231801, the disclosure of which is incorporated herein by reference in its entirety.

FIELD

The present invention relates to a shoe-sole rubber composition and a shoe.

BACKGROUND

Conventionally, outdoor shoes such as trekking shoes and climbing shoes are used for trekking over hill and dale. Climbing shoes are widely used for climbing, for example, artificially created cliffs or natural cliffs. Such climbing shoes are required to provide grip performance even at a site with a rugged ground (see JP 3100592 B).

Meanwhile, in conventional shoes without limitation to outdoor shoes, a part or member constituting a shoe sole such as an outsole is composed of a crosslinked rubber, and a rubber composition forming the crosslinked rubber includes an inorganic filler as a reinforcement material.

SUMMARY

It is an object of the present invention to provide a shoe-sole rubber composition that enables a shoe sole to exhibit both high elasticity and excellent grip performance, while including a white filler, thereby providing the shoe sole having a high elasticity while being excellent in grip performance, and hence to provide a shoe excellent in strength and grip performance.

For improving the basic understanding on the some features of the invention of the present application, a brief summary of the present invention will be described below. This summary does not show the outline of the present invention, and is not intended to specify the main or important features of the present invention or to limit the scope of the present invention. The purpose thereof is only to provide some of basic concepts of the invention in a simplified style as a premise of the subsequent detailed description of the invention.

In order to solve the aforementioned problem, the present invention provides a shoe-sole rubber composition including a rubber and an inorganic filler, wherein the inorganic filler is partially or entirely composed of a white filler, a ratio of the white filler is 50 mass parts or more and 100 mass parts or less based on 100 mass parts of the rubber, an inclination of an approximate straight line (dEhys/dEin) representing a relationship between an input energy (Ein) and a hysteresis loss (Ehys) obtained by tensile testing is 0.6 or more, a gel fraction is 80% or less, and a complex modulus is 30 MPa or more.

In order to solve the aforementioned problem, the present invention provides a shoe including a shoe-sole rubber composition, the rubber composition including a rubber and an inorganic filler, wherein the inorganic filler is partially or entirely composed of a white filler, a ratio of the white filler is 50 mass parts or more and 100 mass parts or less based on 100 mass parts of the rubber, an inclination of an approximate straight line (dEhys/dEin) representing a relationship between an input energy (Ein) and a hysteresis loss (Ehys) obtained by tensile testing is 0.6 or more, a gel fraction is 80% or less, and a complex modulus is 30 MPa or more.

BRIEF DESCRIPTION OF DRAWINGS

The aforementioned features and the other features of the present invention will be clarified by the following description and figures illustrating the embodiments of the present invention.

DESCRIPTION OF EMBODIMENTS

Hereinafter, the present invention will be described by way of embodiments with reference to the drawings. Hereinafter, the description will be given for an embodiment by taking, for example, a climbing shoe.

A shoe sole of a shoe such as climbing shoe used at a site with a rugged ground is conventionally composed of a shoe-sole rubber composition including carbon black as a reinforcement material. It is generally difficult to impart a color other than black to the shoe-sole rubber composition including carbon black. Limitation of colors applicable to the part or member constituting the shoe leads to the limitation to the shoe design, which is undesirable.

Studies are being made to impart a color other than black to a rubber composition forming a shoe sole of shoes such as sneakers by employing a white filler such as silica as a reinforcement material of the rubber composition.

Also, in recent years, attempts are being made to form a shoe sole for climbing shoes by a rubber composition including a white filler. Although it is preferable in some cases that a shoe include a shoe sole composed of a rubber composition having a high elasticity in terms of strength or the like, attempts are further being made in the aforementioned approach to provide a shoe sole composed of a rubber composition having a low elasticity, thereby enabling the shoe sole to exhibit grip performance. There has been established no technique to additionally provide high elasticity to the rubber composition for forming the shoe sole of climbing shoes, for which an attempt is being made to provide high grip performance to the rubber composition while using a white filler. Although climbing shoes will be hereinafter described as an example, when the sneakers or the like mainly used on paved roads are used on the rugged ground, they are also desired to exhibit grip performance in the same manner as the climbing shoes. That is, the shoes required to exhibit high elasticity while using a white filler thereby exhibiting excellent grip performance on the rough ground are not limited to the climbing shoes described below as an example.

Figure 1:
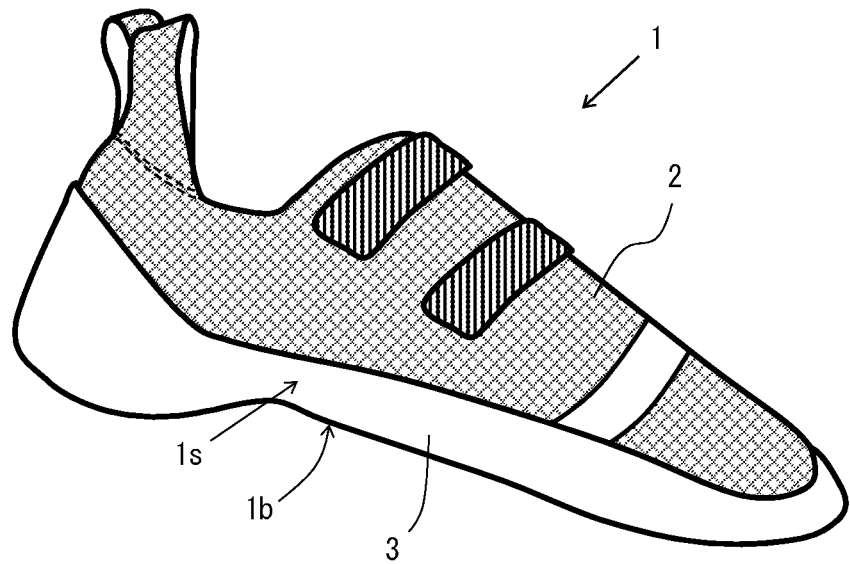
FIG. 1 is a schematic perspective view showing an example of a climbing shoe according to an embodiment.

FIG. 1 shows a schematic perspective view showing an example of a climbing shoe, and a climbing shoe 1 according to this embodiment includes an upper 2 and a shoe sole 3 as illustrated therein. As also illustrated therein, the shoe sole 3 of this embodiment includes a bottom part that constitutes the entirety of a bottom surface 1b of the shoe and a rising part that rises from an outer peripheral edge of the bottom surface 1b of the shoe. That is, the shoe sole 3 of this embodiment constitutes not only the bottom surface 1b of the shoe, but also an outer peripheral surface is on a lower area of the shoe.

The shoe 3 of this embodiment is composed of an uncrosslinked shoe-sole rubber composition or a shoe-sole rubber composition having a low degree of crosslinking. The shoe-sole rubber composition (hereinafter also simply referred to as "rubber composition") includes a rubber and an inorganic filler, in which the inorganic filler is partially or entirely composed of a white filler, and a ratio of the white filler is 50 mass parts or more and 100 mass parts or less based on 100 mass parts of the rubber.

For the rubber included in the rubber composition, use of a single rubber is not essential, and use of two or more rubbers in combination is possible. In the case where the rubber composition includes two or more rubbers, the mass ratio of the white filler to the rubbers in the rubber composition is such that the content of the white filler is 50 mass parts or more and 100 mass parts or less when the total content of the two or more rubbers is 100 mass parts.

The rubber composition has an inclination of the approximate straight line (dEhys/dEin) of 0.6 or more. The inclination of the approximate straight line (dEhys/dEin) represents the relationship between an input energy (Ein) and a hysteresis loss (Ehys) in tensile testing. The rubber composition has a gel fraction value of 80% or less.

The rubber composition has a complex modulus of 30 MPa or more. The complex modulus can be obtained by the dynamic viscoelasticity test described later.

The rubber composition of this embodiment has a loss tangent of 0.12 or more and a complex modulus of 90 MPa or less.

The rubber in the rubber composition is not particularly limited in kind or the like, but is preferably partially or entirely composed of any one of styrene butadiene rubber, styrene-based thermoplastic elastomer, natural rubber, isoprene rubber, and isobutylene-isoprene rubber. The rubber composition may include a plurality of rubbers as described above, the rubber included in the rubber composition of this embodiment at a highest mass ratio (hereinafter also referred to as "base rubber") is preferably any one of styrene butadiene rubber, styrene-based thermoplastic elastomer, natural rubber, isoprene rubber, and isobutylene-isoprene rubber.

A ratio of the base rubber to all the rubbers is, for example, 50 mass % or more. The aforementioned ratio is preferably 60 mass % or more, more preferably 70 mass % or more. The ratio of the base rubber to all the rubbers is, for example, 100 mass % or less. If the rubber composition includes only the base rubber without other rubbers, the characteristics of the rubber composition are required to be adjusted by another component blended therein. Thus, the rubber composition preferably includes a rubber other than the base rubber, and preferably includes a plurality of rubbers. The aforementioned ratio is preferably 95 mass % or less, more preferably 90 mass % or less. The ratio of the base rubber preferably lies in a range set with a lower limit selected from the aforementioned lower limits and an upper limit selected from the aforementioned upper limits.

The base rubber preferably does not change in elasticity within a temperature range in an environment in which conventional shoes are used (for example, at a temperature of 0° C. to 40° C.). The base rubber preferably has high loss tangent in the aforementioned temperature range in order to allow the shoe 1 of this embodiment to have excellent grip performance. Since the loss tangent generally reaches the maximum value in the glass transition temperature, the glass transition temperature of the base rubber is preferably higher than −15° C., more preferably higher than −10° C. in order to allow the shoe 1 of this embodiment to have the grip performance as described above. The aforementioned glass transition temperature of the base rubber is preferably less than 20° C.

The base rubber is preferably any one of styrene butadiene rubber, styrene-based thermoplastic elastomer, and isobutylene-isopropylene rubber (butyl rubber). Among them, the styrene butadiene rubber is suitable as the base rubber since the styrene butadiene rubber is excellent not only in strength and elasticity but also in abrasion resistance. The base rubber may be styrene butadiene rubber obtained by solution polymerization method (hereinafter also referred to as "solution polymerized SBR" or "S-SBR") or styrene butadiene rubber obtained by emulsion polymerization method (hereinafter also referred to as "emulsion polymerized SBR" or "E-SBR"). The base rubber may be halogenated butyl rubber such as chlorinated butyl rubber or brominated butyl rubber.

Examples of the rubber preferably included in the rubber composition include styrene-based thermoplastic elastomer. Examples of the styrene-based thermoplastic elastomer of this embodiment include: a styrene-based thermoplastic elastomer having a diblock structure such as styrene-ethylene-butylene copolymer (SEB), or styrene-ethylene-propylene copolymer (SEP); and a styrene-based thermoplastic elastomer having a triblock structure such as styrene-butadiene-styrene copolymer (SBS), styrene-isoprene-styrene copolymer (SIS), styrene-ethylene-butylene-styrene copolymer (SEBS), styrene-ethylene-propylene-styrene copolymer (SEPS), styrene-ethylene-ethylene-propylene-styrene copolymer (SEEPS), or styrene-butadiene-butylene-styrene copolymer (SBBS). Among them, the styrene-based thermoplastic elastomer preferable as the base rubber is styrene-ethylene-butylene-styrene copolymer (SEBS).

In this embodiment, the rubber composition for forming the shoe sole 3 includes a white filler in addition to the baser rubber. The white filler may have a lower dispersibility in rubber than carbon black that is generally utilized as a rubber reinforcement material. Therefore, the rubber composition may include a liquid rubber in addition to the base rubber in order to improve kneadability in the preparation of the rubber composition. In the case where the solution polymerized SBR or the emulsion polymerized SBR is employed as the base rubber, a rubber, which is in liquid form at normal temperature (23° C.), to be combined therewith may be styrene butadiene rubber (hereinafter also referred to as "liquid SBR" or "L-SBR").

The rubber composition of this embodiment having a high hysteresis loss provides excellent grip performance even in, for example, rugged mountain trails. In order to achieve such excellent grip performance, the rubber composition having a large number of molecular ends in rubber(s) is more effective. The use of the liquid SBR or the like is also effective in increasing the number of molecular ends in the rubber(s) of the rubber composition in order to increase the hysteresis loss.

The mass ratio of the liquid rubber to the base rubber is such that the content of the liquid rubber in the rubber composition may be 10 mass parts or more when the content of the base rubber in the rubber composition of this embodiment is 100 mass parts. The content of the liquid rubber in the aforementioned mass ratio is preferably 15 mass parts or more. The content of the liquid rubber in the aforementioned mass ratio is generally 50 mass parts or less. The content of the liquid rubber in the aforementioned ratio is preferably 40 mass parts or less. The content of the liquid rubber in the aforementioned ratio preferably lies in a range set with a lower limit selected from the aforementioned lower limits and an upper limit selected from the aforementioned upper limits.

A ratio of the total amount of the liquid rubber and the base rubber to all the rubbers in the rubber composition of this embodiment is preferably 90 mass % or more, more preferably 95 mass % or more.

In order to allow a large number of molecular ends to exist in the rubber composition, the base rubber preferably has a broad molecular weight distribution (Mw/Mn). Therefore, of the solution polymerized SBR and the emulsion polymerized SBR, it is effective to employ the emulsion polymerized SBR as the base rubber.

The molecular weight distribution of the emulsion polymerized SBR can be obtained by gel permeation chromatography (GPC) method and calculated with a mass average molecular weight (Mw) and a number average molecular weight (Mn). Each of the mass average molecular weight (Mw) and the number average molecular weight (Mw) can be obtained as a standard styrene-converted value. The molecular weight distribution (Mw/Mn) of the emulsion polymerized SBR is preferably 3 or more, more preferably 3.2 or more. The molecular weight distribution (Mw/Mn) is generally 5 or less.

The rubber composition of this embodiment is made into an uncrosslinked state or a state having a low degree of crosslinking to form the shoe sole 3. The emulsion polymerized SBR is suitable as the base rubber since the emulsion polymerized SBR has generally less vinyl bonds than the solution polymerized SBR, the vinyl bonds being capable of serving as crosslinking points in molecules.

The rubber composition of this embodiment can include a crosslinking agent for crosslinking the rubber molecules. Sulfur or organic peroxide generally used for crosslinking rubber molecules can be employed as the crosslinking agent. The crosslinking agent of the rubber composition is preferably sulfur. The mass ratio of the sulfur to all the rubbers in the rubber composition of this embodiment is such that the content of the sulfur may be more than 0.5 mass parts when the total content of all the rubbers in the rubber composition is 100 mass parts. The content of the sulfur in the aforementioned mass ratio may be more than 0.6 mass parts. The content of the sulfur in the aforementioned mass ratio is preferably less than 1 mass parts, more preferably less than 0.9 mass parts. The content of the sulfur in the aforementioned mass ratio preferably lies in a range set with a lower limit selected from the aforementioned lower limits and an upper limit selected from the aforementioned upper limits.

The rubber composition may further include a compound having a polysulfide structure, which is allowed to function in the same manner as the crosslinking agent, in the molecular structure. Examples of the compound include a silane coupling agent having a tetrasulfide structure. Examples of the silane coupling agent include bis (trimethoxysilylpropyl) disulfide, bis (trimethoxysilylpropyl) disulfide bis (trimethoxysilylpropyl) tetrasulfide, and bis (triethoxysilylpropyl) tetrasulfide. The mass ratio of the sulfur in the compound to the rubber composition is such that the content of the sulfur in the compound is more than 0.1 mass parts when the total content of all the rubbers in the rubber composition is 100 mass parts. The mass ratio of the sulfur in the compound to the rubber composition is such that the content of the sulfur in the compound may be more than 0.2 mass parts when the total content of all the rubbers in the rubber composition is 100 mass parts. The content of the sulfur in the aforementioned mass ratio may be less than 1.5 mass parts. The content of the sulfur in the aforementioned mass ratio is preferably less than 1 mass parts. The content of the sulfur in the aforementioned mass ratio preferably lies in a range set with a lower limit selected from the aforementioned lower limits and an upper limit selected from the aforementioned upper limits.

The rubber composition may include a monosulfide silane coupling agent in addition to the polysulfide silane coupling agent having a polysulfide structure as described above. Examples of the monosulfide silane coupling agent include bis (trimethoxysilylpropylmethacrylate) monosulfide, bis (triethoxysilylpropylmethacrylate) monosulfide, octanoylthiopropyltrimethoxysilane, and octanoylthiopropyltriethoxysilane.

The rubber composition may include a mercapto silane coupling agent such as mercapto propyltrimethoxysilane or mercapto propyltriethoxysilane in addition to the sulfide silane coupling agent such as a polysulfide silane coupling agent or a monosulfide silane coupling agent.

The rubber composition may include a non-sulfur silane coupling agent having no sulfur in the molecule structure in addition to the sulfur-silane coupling agent such as a sulfide silane coupling agent or a mercapto silane coupling agent. Examples of the non-sulfur silane coupling agent includes: an alkoxysilane silane coupling agent such as methyltrimethoxysilane, dimethyldimethoxysilane, methyltriethoxysilane, dimethyldiethoxysilane, n-propyltrimethoxysilane, n-propyltriethoxysilane, hexyltrimethoxysilane, hexyltriethoxysilane, phenyltrimethoxysilane, phenyltriethoxysilane, octyltrimethoxysilane, octyltriethoxysilane, decyltrimethoxysilane, decyltriethoxysilane, bis (trimethoxysilyl) hexane, or trifluoropropyltrimethoxysilane; a vinyl silane coupling agent such as vinyltrimethoxysilane or vinyltriethoxysilane; an epoxy silane coupling agent such as glycidoxypropyltrimethoxysilane, glycidoxypropyltriethoxysilane, glycidoxypropylmethyldimethoxysilane, glycidoxypropylmethyldiethoxysilane, or epoxycyclohexylethyltrimethoxysilane; a (meta)acryl silane coupling agent such as (meta)acryloxypropyltrimethoxysilane, (meta)acryloxypropyltriethoxysilane, (meta)acryloxypropyldimethoxysilane, (meta)acryloxypropylmethyldimethoxysilane, or (meta)acryloxypropylmethyldiethoxysilane; an amino silane coupling agent such as aminopropyltrimethoxysilane, aminopropyltriethoxysilane, aminoethylaminopropyltrimethoxysilane, aminoethylaminopropyltriethoxysilane, aminoethylaminopropylmethyldimethoxysilane, aminoethylaminopropylmethyldiethoxysilane, phenylaminopropyltrimethoxysilane, or phenylaminopropyltriethoxysilane; an isocyanate silane coupling agent such as isocyanatepropyltrimethoxysilane or isocyanatepropyltriethoxysilane; and an isocyanurate silane coupling agent such as tris(trimethoxysilylpropyl) isocyanurate.

Examples of the white filler included in the rubber composition include silica, calcium carbonate, magnesium carbonate, and barium carbonate. The white filler may be, for example, mica mineral such as sericite. The white filler may be talc, clay, alumina, aluminum hydroxide, magnesium hydroxide, titanium oxide, calcium sulfate, barium sulfate, or the like. The white filler preferably has a white index (JIS P8148) of a flat plane being 60% or more, the flat plane being formed by pressing the white filler by, for example, a glass plate. The white index may be 70% or more, 80% or more, or 90% or more.

For the white filler included in the rubber composition of this embodiment, use of a single white filler is not essential, and use of two or more white fillers is possible. In the case where the rubber composition includes two or more white fillers, the mass ratio of the white fillers to the rubbers in the rubber composition is such that the total content of the two or more white fillers is 50 mass parts or more and 100 mass parts or less when the total content of all the rubbers is 100 mass parts.

The content of the white filler(s) is preferably 55 mass parts or more, more preferably 60 mass parts or more. The content of the white filler(s) is preferably 95 mass parts or less, more preferably 90 mass parts or less. The content of the white filler(s) preferably lies in a range set with a lower limit selected from the aforementioned lower limits and an upper limit selected from the aforementioned upper limits.

The white filler is preferably silica. The rubber composition may include silica produced by wet process (hereinafter also referred to as "wet silica") or silica produced by dry process (hereinafter also referred to as "dry silica").

In the rubber composition of this embodiment, it is preferable that an agglomerate of particles is formed by a part of the white filler. The rubber composition of this embodiment preferably includes a plurality of agglomerates of particles formed by the white filler. The agglomerate of particles may be a primary agglomerate of particles which are secondary particles formed by gathering primary particles of the white filler. The agglomerate of particles may be a secondary agglomerate of particle formed by gathering the primary agglomerate of particles. The rubber composition of this embodiment including the primary agglomerate of particles or the secondary agglomerate of particles shows high hysteresis loss since the primary agglomerate of particles or the secondary agglomerate of particles are partially collapsed when applied with a stress.

As seen from the above, the silica is preferably dry process silica that tends to include a primary agglomerate of particles. The dry process silica may be silica produced by precipitation process (hereinafter also referred to as "precipitated silica") or silica produced by gel process (hereinafter also referred to as "gel-processed silica"). The wet silica is preferably precipitated silica that is easily collapsed when applied with a stress.

The white filler such as silica included in the rubber composition preferably has an average particle diameter of 1 μm or more. The aforementioned average particle diameter is more preferably 2 μm or more, still more preferably 5 μm or more. The aforementioned average particle diameter is preferably 30 μm or less, more preferably 25 μm or less. The average particle diameter herein means a volume-based median diameter (D50) obtained by laser diffraction scattering method. The average particle diameter of the white filler preferably lies in a range set with a lower limit selected from the aforementioned lower limits and an upper limit selected from the aforementioned upper limits.

The rubber composition may include a filler other than the white filler. The rubber composition preferably does not excessively include fillers other than the white filler in order to allow the rubber composition itself to be easily adjusted to a desired color. A ratio of the white filler to all the inorganic fillers in the rubber composition is preferably 95 mass % or more, more preferably 98 mass % or more.

The rubber composition may further include a pigment such as red pigment or blue pigment in order to form the shoe sole 3 having a chromatic color. The rubber composition may include an additive such as an antiaging agent, an antioxidant, a weather-proof agent, an ultraviolet absorbent, a light stabilizer, a flame retardant, a mold releasing agent, an electrostatic preventing agent, an antimicrobial agent, a fungicidal agent, a deodorizer, a fragrance, or the like.

The rubber composition of this embodiment, which is formed to have a gel fraction of 80% or less, forms the shoe sole 3 as described above.

The term "gel fraction" in this embodiment means a ratio of rubber not eluted by solvent extraction test (also referred to as "insoluble rubber") to the total amount of rubbers. Specifically, the gel fraction of the rubber composition can be determined in the manner as described below.

<Method for Determining a Gel Fraction>

A disc-shaped sample having a through hole at the center and having a diameter of about 8 mm, a thickness of about 2 mm, and a mass of about 0.2 g is cut out from a shoe sole, followed by accurate measurement of the mass of the obtained sample as an initial mass (M0). 4 samples having a mass of about 0.2 g are separately prepared in the same manner as above, followed by accurate measurement of the initial mass of each of the samples. Next, 5 sample tubes each having a volume of 50 mL in which toluene of about 45 mL is stored are prepared, followed by allowing the samples to be immersed in toluene and respectively placing the samples in the 5 sample tubes. Each of the samples is immersed in toluene while being suspended in the sample tube with a thin wire inserted through the through hole. Each of the sample tubes is covered with a lid and is left stand at a temperature of 35° C. for 72 hours. The samples are respectively taken out from the sample tubes after the lapse of 72 hours, followed by subjecting each of them to vacuum dehydration and accurate measurement of the mass (M) after vacuum dehydration.

A ratio of the content of components other than rubber (A (mass %)) in each of the initial samples is obtained by measuring an ash content of each of the initial samples. The ash content is measured based on JIS K6226-1 and JIS K6226-2. A mass of rubber (initial mass: Mi) in each of the initial samples is calculated using the value of the initial mass (M0) and the content ratio of the components other than rubber (A (mass %)) in each of the initial samples.

$$\text{Initial mass of rubber } (Mi) = M0 \times (100-A)/100$$

Also, a mass of rubber (mass of insoluble rubber: Mb) in each of the samples immersed in toluene for 72 hours followed by vacuum dehydration is obtained by the expression below.

$$\text{Mass of insoluble rubber } (Mb) = M1 \times (100-A)/100$$

A ratio of the mass of the insoluble rubber (Mb) to the initial mass (Mi) is calculated, followed by calculation of a gel fraction ((Mb/Mi)×100%) of each of the samples. A gel fraction of the rubber composition is determined by arithmetically averaging the measured results of 5 samples. Note that the measurement results that appear to be aberrant values are excluded. In the measurement for gel fraction of the rubber composition, an arithmetic mean value is, in principle, obtained from 5 measurement values as described above. However, in the case where, for example, 5 samples in total cannot be prepared, the measurement may be performed by reducing the number of samples for measurement.

The gel fraction of the rubber composition is preferably 77% or less, more preferably 76% or less, still more preferably 75% or less. Although it is preferable for the rubber composition to have a low gel fraction in order to have higher hysteresis loss, a gel fraction, which is high to some extent, is effective in order to allow the shoe sole 3 to exhibit excellent oil resistance and excellent chemical resistance. Accordingly, the gel fraction of the rubber composition is preferably 30% or more, more preferably 40% or more, still more preferably 50% or more. The gel fraction of the rubber composition preferably lies in a range set with a lower limit selected from the aforementioned lower limits and an upper limit selected from the aforementioned upper limits. The gel fraction of the rubber composition can be generally adjusted by controlling the degree of crosslinking of rubber molecules.

The rubber composition of this embodiment forms the shoe sole 3 so that, when tensile testing is performed, the inclination of an approximate straight line (dEhys/dEin) of plots obtained from "input energy (Ein)-hysteresis loss (Ehys)" in the tensile testing is 0.6 or more.

The inclination of an approximate straight line (dEhys/dEin) can be determined in the manner as described below.
<Method for Determining the Inclination of an Approximate Straight Line>

Figure 2:
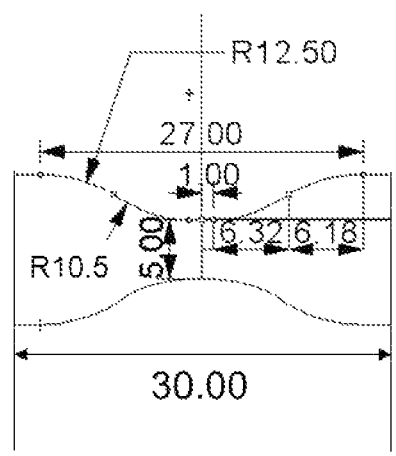
FIG. 2 is a view showing an example of a shape of a sample for measurement of the inclination of an approximate straight line.

A dumbbell-shaped test piece having a uniform thickness of about 2 mm is cut out from the shoe sole. The dumbbell-shaped test piece is formed to have a shape as shown in FIG. 2. Specifically, the dumbbell-shaped test piece has a parallel portion having a width of 5 mm and a length of 2 mm. If there is a difficulty in cutting out such a dumbbell-shaped test piece from the shoe sole, a dumbbell-shaped test piece may be cut out from a test sheet produced from a rubber composition having the same constituents as those of the shoe sole.

The dumbbell-shaped test piece is set on a tensile testing instrument with a distance between chucks being 12 mm. The test piece set on the tensile testing instrument is drawn at a drawing speed of 1 mm/min to have an amount of displacement of 5% (12 mm×5%=0.6 mm), followed by immediately allowing the test piece to restore to the initial state at the same speed as the drawing speed. Herein, a value of integral of SS curve (stress-strain curve) measured at the time of tension by the tensile testing instrument is represented as input energy (Ein). A difference (Ein−Ein') between a value of integral of SS curve at the time of restoration (Ein') and the input energy (Ein) is represented as hysteresis loss (Ehys). Next, the input energy (Ein) and the hysteresis loss (Ehys) are obtained when the amount of displacement is 25% (3 mm), 50% (6 mm), and 100% (12 mm). Subsequently, the data obtained at these 4 displacement points are plotted on a graph with a horizontal axis representing input energy (Ein) and a vertical axis representing hysteresis loss (Ehys) to obtain an approximate straight line through the origin by the least squares method, to obtain the inclination of the approximate straight line (dEhys/dEin). In principle, the tensile testing is performed at a temperature of 23° C. and a relative humidity of 50%, and the dumbbell-shaped test piece is left stand in the aforementioned environment over 12 hours to be served as a test piece for tensile testing.

The aforementioned inclination (dEhys/dEin) is generally less than 1 and is preferably 0.9 or less. The aforementioned inclination (dEhys/dEin) is more preferably 0.8 or less.

The aforementioned inclination (dEhys/dEin) generally is controllable by adjusting the hysteresis loss of the rubber composition. The hysteresis loss of the rubber composition is adjustable by adjusting the content of inorganic filler in aggregate form which is collapsible when applied with a stress. The hysteresis loss of the rubber composition is also adjustable by adjusting the degree of occurrence of rubbing between rubber molecular chains when applied with a stress. The degree of occurrence of rubbing between the molecular chains is adjustable by adjusting, for example, the crosslinking density of rubber or the abundance of molecular ends within the rubber composition.

The grip performance provided by the rubber composition is such that a static friction coefficient obtained by the measurement method described in the embodiment is preferably 1.5 or more. The aforementioned static friction coefficient is more preferably 1.7 or more, still more preferably 1.9 or more.

The rubber composition forms the shoe sole 3 while having a loss tangent (tan δ) of 0.12 or more. The loss tangent (tan δ) of the rubber composition can be obtained by dynamic viscoelasticity test performed at a temperature of 25° C., a strain amount of 0.025%, and a frequency of 10 Hz. Further, the rubber composition forms the shoe sole 3 while having a complex modulus (E*) obtained by dynamic viscoelasticity test performed in the same test conditions being 30 MPa or more and 90 MPa or less.

The dynamic viscoelasticity test can be performed according to JIS K7244-4, for example, in the manner as described below.
<Test Method of Dynamic Viscoelasticity Test>

A strip-shaped test piece having certain dimensions (for example, with a length of 33±3 mm, a width of 5±0.3 mm, and a thickness of 2±0.3 mm) is collected from the shoe sole 3. If there is a difficulty in cutting such a test piece from the shoe sole 3, a strip-shaped test piece may be cut out from a test sheet produced from a rubber composition having the same constituents as those of the shoe sole 3. The strip-shaped test piece is set to a dynamic viscoelasticity measuring instrument such that a distance between chucks is 20±0.2 mm. The test is performed in the conditions with tensile mode of a sinusoidal strain as a measurement mode; an automatic static load; a dynamic strain rate of 5 μm (0.025%); and a frequency of 10 Hz. The test temperature of the dynamic viscoelasticity test is 25° C. and the strip-shaped test piece is held in an environment at 25° C. over 12 hours to be served as a test piece for dynamic viscoelasticity test.

The loss tangent of the rubber composition is preferably 0.13 or more, more preferably 0.14 or more. The aforementioned loss tangent is preferably 0.22 or less, more preferably 0.21 or less.

The complex modulus of the rubber composition is preferably 50 MPa or more, more preferably 60 MPa or more, still more preferably 70 MPa or more. The aforementioned complex modulus is preferably 85 MPa or less. Each of the aforementioned loss tangent and the aforementioned complex modulus preferably lies in a range set with a lower limit selected from the aforementioned lower limits and an upper limit selected from the aforementioned upper limits.

The loss tangent and the complex modulus of the rubber composition can be adjusted by adjusting the loss tangent and the complex modulus of the rubber employed as the base rubber.

In the shoe 1 of this embodiment, the shoe sole 3 is composed of a specific rubber composition as described above, while the upper 2 may be composed of a conventionally known material.

The shoe 1 of this embodiment including the shoe sole 3 composed of the rubber composition exhibits high grip performance even in the case where the shoe sole 3 is allowed to engage the ground through only a small area of the shoe sole 3 in, for example, hill climbing, such as climbing the scree-covered trail or the like, rock climbing, or cliff climbing. That is, the shoe 1 of this embodiment can stably support the wear's standing position even in a situation where the shoe sole 3 engages the ground through point contact.

The shoe 1 of this embodiment can support the wear's standing position in, for example, sports climbing to climb artificially created cliffs. That is, the climbing shoe of this embodiment can significantly exhibit its effect not only in the use in nature, but also in sports climbing or the like.

In this embodiment, the rubber composition is formed to have a lower degree of crosslinking than that of conventional shoe-sole rubber compositions, or formed to be as an uncrosslinked rubber composition in some cases to have specific hysteresis characteristics, thereby allowing the shoe sole to exhibit both of high elasticity and excellent grip performance. According to the shoe 1 of this embodiment, the rubber composition having a high elasticity enables the shoe sole 3 to exhibit excellent strength. Accordingly, the shoe 1 of this embodiment is unlikely to cause the wearer to feel foot pain even in the case where the load of the wearer is concentrated at one point of the shoe sole when, for example, the wearer steps on a pointed stone. When this feature is considered in a different aspect, the shoe sole 3 of the shoe 1 of this embodiment can be formed to be thinner than the conventional climbing shoes, thereby exhibiting excellent lightweight properties.

According to the shoe 1 of this embodiment, the shoe sole 3 can be provided with extensive color variation. That is, the shoe 1 of this embodiment can realize excellent design characteristics.

The shoe-sole rubber composition of this embodiment exhibits the same effect not only when used for forming the shoe sole of climbing shoes but also when used for forming the shoe sole of common sports shoes. Further, various modifications can be made to the aforementioned examples of the present invention. That is, the present invention is not limited to the aforementioned exemplification in any way.

EXAMPLES

Next, the present invention will be described in more detail by way of Examples, but not limited thereto.

EXAMPLES AND COMPARATIVE EXAMPLES (Compound Materials)
The following raw materials were prepared for preparing rubber compositions.
  SBR: Styrene butadiene rubber (emulsion polymerized SBR) having a styrene content of about 50 mass %
  SEBS: Styrene-ethylene-butylene-styrene copolymer
  Br-IIR: Brominated butyl rubber
  NR: Natural rubber
  L-SBR: Liquid SBR
  PO: Paraffin oil
  $SiO_2$: Precipitated silica including an agglomerate of particles and having an average particle diameter of about 20 μm
  CA: bis (triethoxysilylpropyl) tetrasulfide
  PEG: Polyethyleneglycol having a mass average molecular weight of about 2,000 and a melting point of about 52° C.
  Vulcanizing agent 1: Sulfur
  Vulcanizing agent 2: 4,4'-dithiodimorpholine
  Vulcanizing accelerator1: Di-2'-benzothiazolyldisulfide
  Vulcanizing accelerator2: Tetramethylthiuram Monosulfide
  Vulcanizing accelerator3: Dilaurylthiourea (Production of Crosslinked Sheet)
An uncrosslinked sheet was prepared by an uncrosslinked rubber composition with mixing ratios as shown in Table 1, followed by setting the uncrosslinked sheet over a square through hole formed in a metal frame, and hot pressing the metal frame between two press plates, to produce a crosslinked sheet having a given thickness.

(Evaluation of Mechanical Properties and Gel Fraction)
A test piece was cut out from the crosslinked sheet, and the complex modulus (E*), the loss tangent (tan), the inclination of an approximate straight line (dEhys/dEin) of plots obtained from "input energy (Ein)-hysteresis loss (Ehys)" in the tensile testing, and the gel fraction of the test piece were measured.

(Evaluation of Friction Coefficient)
The friction coefficient was measured using the linear type friction tester, product name "μV-1000" manufactured by Trinity-Lab. Inc., as a tester. An uncrosslinked sheet was prepared by an uncrosslinked rubber composition, followed by setting the uncrosslinked sheet over a square through hole formed in a metal frame having a thickness of 2 mm, and hot pressing the metal frame between two press plates, to produce a crosslinked sheet. The crosslinked sheet was produced to have a sufficiently smooth surface using a mirror plate in hot pressing. After that, the surface of the crosslinked sheet was subjected to roughening treatment with a polishing paper (count #400) to have an entirely even surface. A test sheet having a width of 20 mm, a length of 40 mm, and a thickness of 2 mm was cut out from the crosslinked sheet. The test sheet was fixed to an upper surface of the table movable at a constant speed in the horizontal direction. The test sheet was fixed with its length direction coincided with the moving direction of the table. A bouldering hold having an average curvature radius (R) of 14 mm and a surface roughness (maximum height roughness (Rz)=366 μm) was allowed to come into abutting contact with an upper surface of the test sheet, allowed to apply a load of 1 kgf to the test sheet, and left stand for 10 seconds, followed by moving the table at a speed of 10 mm/sec. The maximum value of friction coefficient observed in the initial moving stage of the table was referred to as a static friction coefficient. Preliminary friction tests were performed over 10 times in the test. Among the preliminary friction tests, the last three measurement results in which measured values became stable were taken to obtain an arithmetic mean value to be served as the static friction coefficient of the test sheet.

The evaluation results obtained in the above experiment were shown in Table below.

TABLE 1

|      | C. Ex. 1 | C. Ex. 2 | C. Ex. 3 | Ex. 1 | C. Ex. 4 | Ex. 2 | Ex. 3 | Ex. 4 | Ex. 5 |
|------|----------|----------|----------|-------|----------|-------|-------|-------|-------|
| SBR  | 0 | 0 | 0 | 0 | 100 | 100 | 100 | 70 | 0 |
| SEBS | 0 | 0 | 0 | 0 | 0 | 0 | 0 | 30 | 0 |

TABLE 1-continued

|  | C. Ex. 1 | C. Ex. 2 | C. Ex. 3 | Ex. 1 | C. Ex. 4 | Ex. 2 | Ex. 3 | Ex. 4 | Ex. 5 |
|---|---|---|---|---|---|---|---|---|---|
| Br-IIR | 100 | 100 | 100 | 100 | 0 | 0 | 0 | 0 | 0 |
| NR | 0 | 0 | 0 | 0 | 0 | 0 | 0 | 0 | 100 |
| L-SBR | 0 | 0 | 0 | 0 | 0 | 30 | 30 | 30 | 30 |
| PO | 10 | 10 | 10 | 0 | 10 | 0 | 0 | 0 | 0 |
| SiO$_2$ | 45 | 45 | 70 | 70 | 45 | 90 | 90 | 90 | 90 |
| CA | 3 | 0 | 0 | 0 | 3 | 7.2 | 0.9 | 1.8 | 7.2 |
| PEG | 1.5 | 1.5 | 1.5 | 1.5 | 1.5 | 2.3 | 2.3 | 2.3 | 2.3 |
| Vulcanizing agent 1 | 0 | 0 | 0 | 0 | 2 | 1 | 1 | 1 | 0 |
| Vulcanization accelerator 1 | 0 | 0 | 0 | 0 | 1 | 1 | 1 | 1 | 1 |
| Vulcanization accelerator 2 | 1 | 1 | 1 | 1 | 0.6 | 1.5 | 1.5 | 1.5 | 1.5 |
| Vulcanization accelerator 3 | 4 | 4 | 4 | 0.5 | 0 | 0 | 0 | 0 | 0 |
| Vulcanizing agent 4 | 1 | 1 | 1 | 0.5 | 0 | 0 | 0 | 0 | 0 |
| E*(MPa) | 4.4 | 10.7 | 27.5 | 52.2 | 21.6 | 78.35 | 70.9 | 79.0 | 39.75 |
| tanδ (atRT) | 0.23 | 0.18 | 0.16 | 0.07 | 0.19 | 0.19 | 0.12 | 0.21 | 0.12 |
| dEhys/dEin (ND) | 0.22 | 0.48 | 0.65 | 0.86 | 0.40 | 0.65 | 0.81 | 0.79 | 0.68 |
| Gel fraction (%) | 84 | 84 | 82 | 77 | 85 | 78 | 67 | 69 | 76 |
| Static friction coefficient (ND) | 1.62 | 1.78 | 1.82 | 1.91 | 1.73 | 1.59 | 2.10 | 2.05 | 1.91 |

It is evident from the above results that a shoe-sole rubber composition that enables the shoe sole to exhibit both high elasticity and excellent grip performance while including a white filler can be provided according to the present invention.

Although the shoe-sole rubber composition and the shoe according to this embodiment are as described above, the present invention is not limited to the aforementioned embodiment and the design may be appropriately changed within the scope where the present invention is intended. Also, the functional effect of the present invention is not limited to the aforementioned embodiment. That is, the embodiments disclosed herein should be assumed as not limitations but exemplifications in all aspects. The scope of the present invention is described not by the above description but by the claims. Further, the scope of the present invention is intended to include the scope equivalent to the claims and all the changes in the claims.

What is claimed is:

1. A shoe-sole comprising:
   a bottom surface; and
   an outer peripheral surface,
   the shoe-sole having a composition comprising:
      a rubber;
      at least three selected from the group consisting of sulfur, 4,4'-dithiodimorpholine, di-2'-benzothiazolyldisulfide, tetramethylthiuram monosulfide, and dilaurylthiourea; and
      an inorganic filler,
   wherein
      the inorganic filler is partially or entirely composed of a white filler,
      a ratio of the white filler is 50 mass parts or more and 100 mass parts or less based on 100 mass parts of the rubber,
      in the shoe-sole, an inclination of an approximate straight line (dEhys/dEin) representing a relationship between an input energy (Ein) and a hysteresis loss (Ehys) obtained by tensile testing is 0.6 or more,
      a gel fraction is 80% or less,
      a complex modulus is 30 MPa or more, and
      the rubber includes liquid styrene butadiene rubber.

2. The shoe-sole according to claim 1, wherein
   a loss tangent is 0.12 or more, and
   the complex modulus is 90 MPa or less.

3. The shoe-sole according to claim 1, further comprising:
   a plurality of agglomerates of particles constituted by the white filler.

4. The shoe-sole according to claim 1, wherein
   the rubber comprises any one of styrene butadiene rubber, styrene-based thermoplastic elastomer, natural rubber, isoprene rubber, and isobutylene-isoprene rubber.

5. The shoe-sole according to claim 1, wherein the shoe-sole does not include oil.

6. A shoe comprising:
   a shoe-sole having a bottom surface and an outer peripheral surface,
   the shoe-sole comprising a rubber composition, the rubber composition comprising a rubber, at least three selected from the group consisting of sulfur, 4,4'-dithiodimorpholine, di-2'-benzothiazolyldisulfide, tetramethylthiuram monosulfide, and dilaurylthiourea, and an inorganic filler, wherein
   the inorganic filler is partially or entirely composed of a white filler,
   a ratio of the white filler is 50 mass parts or more and 100 mass parts or less based on 100 mass parts of the rubber,
   in the shoe-sole, an inclination of an approximate straight line (dEhys/dEin) representing a relationship between an input energy (Ein) and a hysteresis loss (Ehys) obtained by tensile testing is 0.6 or more,
   a gel fraction is 80% or less,
   a complex modulus is 30 MPa or more, and
   the rubber includes liquid styrene butadiene rubber.

7. The shoe according to claim 6, wherein
   a loss tangent is 0.12 or more, and
   the complex modulus is in a range of 60 MPa to 90 MPa.

8. The shoe according to claim 6, further comprising:
   a plurality of agglomerates of particles constituted by the white filler.

9. The shoe according to claim 6, wherein
   the rubber further comprises any one of styrene butadiene rubber, styrene-based thermoplastic elastomer, natural rubber, isoprene rubber, and isobutylene-isoprene rubber.

10. The shoe according to claim 7, further comprising:
    a plurality of agglomerates of particles constituted by the white filler.

11. The shoe according to claim 7, wherein
    the rubber further comprises any one of styrene butadiene rubber, styrene-based thermoplastic elastomer, natural rubber, isoprene rubber, and isobutylene-isoprene rubber.

12. The shoe according to claim 8, wherein
the rubber further comprises any one of styrene butadiene rubber, styrene-based thermoplastic elastomer, natural rubber, isoprene rubber, and isobutylene-isoprene rubber.

13. The shoe according to claim 10, wherein
the rubber further comprises any one of styrene butadiene rubber, styrene-based thermoplastic elastomer, natural rubber, isoprene rubber, and isobutylene-isoprene rubber.

14. The shoe according to claim 6, which is a climbing shoe.

15. The shoe according to claim 7, which is a climbing shoe.

16. The shoe according to claim 8, which is a climbing shoe.

17. The shoe according to claim 10, which is a climbing shoe.

18. The shoe according to claim 9, which is a climbing shoe.

19. The shoe according to claim 11, which is a climbing shoe.

20. The shoe according to claim 12, which is a climbing shoe.

21. The shoe according to claim 13, which is a climbing shoe.

22. A shoe-sole comprising:
a bottom surface; and
an outer peripheral surface,
the shoe-sole having a composition comprising:
  a rubber;
  at least three selected from the group consisting of sulfur, 4,4'-dithiodimorpholine, di-2'-benzothiazolyldisulfide, tetramethylthiuram monosulfide, and dilaurylthiourea; and
  an inorganic filler,
wherein
  the inorganic filler is partially or entirely composed of a white filler,
  a ratio of the white filler is 50 mass parts or more and 100 mass parts or less based on 100 mass parts of the rubber,
  in the shoe-sole, an inclination of an approximate straight line (dEhys/dEin) representing a relationship between an input energy (Ein) and a hysteresis loss (Ehys) obtained by tensile testing is 0.6 or more,
  a gel fraction is 80% or less,
  a complex modulus is 30 MPa or more, and
  the white filler has an average particle diameter of 2 μm or more.

23. A shoe-sole comprising:
a bottom surface; and
an outer peripheral surface,
the shoe-sole having a composition comprising:
  a rubber;
  at least three selected from the group consisting of sulfur, 4,4'-dithiodimorpholine, di-2'-benzothiazolyldisulfide, tetramethylthiuram monosulfide, and dilaurylthiourea; and
  an inorganic filler,
wherein
  the inorganic filler is partially or entirely composed of a white filler,
  a ratio of the white filler is 50 mass parts or more and 100 mass parts or less based on 100 mass parts of the rubber,
  in the shoe-sole, an inclination of an approximate straight line (dEhys/dEin) representing a relationship between an input energy (Ein) and a hysteresis loss (Ehys) obtained by tensile testing is 0.6 or more,
  a gel fraction is 80% or less,
  a complex modulus is 30 MPa or more, and
  the white filler has an average particle diameter of 5 μm or more.

* * * * *